United States Patent [19]

Gysling et al.

[11] Patent Number: 4,781,992

[45] Date of Patent: Nov. 1, 1988

[54] CORROSION INHIBITION OF IRON AND ITS ALLOYS

[75] Inventors: Henry J. Gysling; Joseph S. Yudelson, both of Rochester, N.Y.

[73] Assignee: Eastman Kodak Company, Rochester, N.Y.

[21] Appl. No.: 158,808

[22] Filed: Feb. 22, 1988

Related U.S. Application Data

[62] Division of Ser. No. 58,306, Jun. 5, 1987, Pat. No. 4,743,466.

[51] Int. Cl.$^4$ ................................................. B05D 5/12
[52] U.S. Cl. .................................... 428/694; 428/900; 427/128

[58] Field of Search ................. 428/694, 900; 427/128

[56] References Cited

U.S. PATENT DOCUMENTS 4,618,537 10/1986 Takano ................................ 428/694

Primary Examiner—Sam Silverberg
Attorney, Agent, or Firm—Robert A. Gerlach

[57] ABSTRACT

For use in magnetic recording tapes and for other purposes, iron and iron alloy materials are passivated and protected against oxidative corrosion by treatment with a solution of a non-hygroscopic salt of bis(triphenylphosphoranylidene) ammonium cation with an anion such as nitrite or chromate.

5 Claims, No Drawings

CORROSION INHIBITION OF IRON AND ITS ALLOYS

This is a division of application Ser. No. 58,306, filed June 5, 1987, now U.S. Pat. No. 4,743,466.

FIELD OF THE INVENTION

This invention relates to a method of passivating or inhibiting the oxidative corrosion of iron and iron alloys and, more particularly, to a method of passivating iron particles used in magnetic recording and to a magnetic recording element containing such passivated iron particles.

BACKGROUND

Magnetic recording tapes, disks and cards comprise a non-magnetic base such as a polyester or polycarbonate film on which is coated a magnetic layer composed of ferromagnetic particles dispersed in a binder resin.

Although iron oxide particles were used in the earlier magnetic tapes and ferric oxide is still commonly used, metallic iron particles offer important advantages for high energy or high density magnetic recording materials. Metallic iron particles having higher magnetizations than ferric oxide, they can be made smaller than oxide particles without risking paramagnetization and their coercivity is high. Unfortunately, the metallic particles are highly reactive with oxygen and moisture and will quickly corrode when exposed to air and moisture and the recording properties will deteriorate. Numerous attempts have been made to provide coatings to protect against oxidative corrosion, but all have drawbacks. A need has existed for a better method of protecting iron and iron alloys in general against corrosion and especially for a method that can be employed in the manufacture of recording materials which have a coated magnetic layer of iron or iron alloy particles dispersed in a binder resin.

BRIEF STATEMENT OF THE INVENTION

The present invention provides a method for passivating or protecting metallic iron and iron alloys against oxidative corrosion. The method of the invention comprises treating the iron or iron alloy with an organic liquid solution of a salt of the bis(triphenylphosphoranylidene) ammonium cation and a non-corrosive, passivating anion. In preferred embodiments the iron or iron alloy is in the form of finely divided magnetic particles dispersed in a resin binder and the anion is the nitrite ion.

The invention also includes a magnetic recording element comprising a support on which is coated a layer which comprises a binder resin, iron particles and a salt of the bis (triphenylphosphoranylidene) ammonium cation with a non-corrosive, passivating anion.

DETAILED DESCRIPTION

The salts used in the present method are known substances, but have not heretofore been suggested as iron passivating agents. The cation of the salt, which herein is called bis (triphenylphosphoranylidene) ammonium ion, is also known by other names such as bis(triphenylphosphine) iminium ion and $\mu$-nitrido-bis(triphenylphosphorous) (1+). It is also commonly referred to by the abbreviation PPN, as in the paper by R. E. Stevens et al, *J. Am. Chem. Soc.*, (1981), 103, 4981–82, and can be represented by the formula, $(Ph_3P)_2N^+$.

We have found that salts of this cation with a non-corrosive, passivating anion, such as nitrite and others are unexpectedly valuable passivating agents for iron and its alloys and especially for iron particles in the manufacture of magnetic recording materials. It is known that the surfaces of iron particles can be stabilized against further oxidation by building up an oxide layer which renders the iron passive or resistant to corrosive reactions. Treatment with oxidizing anions such as nitrites and chromates will make this oxide layer more passive and resistant to physical damage which would cause the iron surface to begin corroding. The use of inorganic nitrites and chromates for such corrosion protection is known. See U.S. Pat. Nos. 2,419,327; 2,432,840 and 2,432,839. Inorganic nitrites are impractical for many purposes, however, For example, if the iron is to be coated with a protective resin coating the inorganic salts are incompatible with the organic coatings.

Organic salts, such as dicyclohexylamine nitrite have been used for iron passivation but most organic salt nitrites are of high vapor pressure and useful only in vapor phase treatments. As for solid organic nitrites and chromates that are soluble in resin coatings, only a few are known. The most common are ammonium and phosphonium salts. These, however, are extremely hygroscopic and cannot be used when mechanical and chemical stability are required.

For an oxidizing anion such as nitrite or chromate to be effective in passivating metallic iron, its salt must be soluble in the surrounding medium. For magnetic tapes and disks, the salt must be soluble in the coating solvent used in manufacturing the materials and should have some degrees of solubility in the binder resin. However, since the binder is only a minor component of the magnetic layer, high solubility in the binder is not necessary.

We have discovered that bis(triphenylphosphoranylidene) ammonium salts are unexpectedly ideal for passivating iron particles. These salts are easily separated from the reaction medium in which they are prepared and they show no hygroscopicity.

In the method of the present invention the iron particles can be treated with the PPN salts at different stages in the formulation of the magnetic coatings. Thus a solution of the salt can be mixed with the iron particles before they are mixed with the resin binder or the salt can be dissolved in the solution of the binder resin before mixing with the iron particles. The temperature of treatment is not critical and can vary over a wide range. Treatment at room temperature is preferred. To ensure that the organic salt solution penetrates the oxide layer of the iron particles as completely as possible, it is preferred that the time of contact with the salt solution be several hours, e.g., up to about 24 hours. This is not essential, however, for satisfactory passivation can be achieved with only a brief contact of the iron particles with the salt solution at room temperature.

The following two examples illustrate the preparation of nitrite and chromate salts of PPN which are used in the method of the invention.

EXAMPLE 1

PREPARATION PPN NITRITE

This compound was prepared by a metathetical reaction between $[PPN]^+Cl^-$ prepared by the procedure of Ruff et al, *Inorg. Synth.*, 15, 84 (1974) and excess $KNO_2$. [PPN]Cl (12.5 g, 21.8 mmoles) in 250 ml of hot water was added to a solution of 12.5 g (146.9 mmoles) KN$_2$ in 120 ml boiling water. The resulting suspension was stirred for 0.5 hr, filtered and washed with 3×75 ml portions of water and air dried. This initial product (10.55 g) was recrystallized twice from 700 ml of boiling water to give analytically pure [PPN]NO$_2$ (Calcd. C$_{36}$H$_{30}$N$_2$O$_2$P$_2$: C, 73.97; H, 5.17; N, 4.79; P, 10.60. Found: C, 72.9; H, 5.3; N, 4.6; P, 10.2.)

Infra red spectrometry showed the compound to have the characteristic IR absorptions at 800 and 1250 cm$^{-1}$.

EXAMPLE 2

Preparation of PPN Chromate

A solution of [PPN]Cl (6.25 g, 10.9 mmoles) in 125 ml of hot water was added to a solution of K$_2$CrO$_4$ (19.4 g, 100 mmoles) in 60 ml of hot water. The resulting suspension was stirred for 0.5 hr, filtered and the solid precipitate was washed with four 150 ml portions of water and air dried. Recrystallization twice from 850 ml of water gave analytically pure [PPN]$_2$CrO$_4$ (Calcd. C$_{72}$H$_{60}$N$_2$P$_4$CrO$_4$: C, 72.48; H, 5.07; N, 2.35; Cr, 4.35. Found: C, 72.5; H, 5.3; N, 2.1; Cr, 4.4).

The next example describes the treatment of small pellets of compressed iron powder with an organic solution of the salt of Example 1, in accordance with the present invention, and the corrosion testing of the treated pellets.

EXAMPLE 3

Passivation of Iron Pellets with PPN Nitrite

Iron pellets prepared by compressing pure iron powder into the shape of disks about the size of a dime were treated as follows:
  (a) No treatment.
  (b) Submerged for several hours at room temperature in a 1% methyl ethyl ketone (MEK) solution of the nitrite salt described in Example 1.
  (c) As (b) but with no nitrite salt. The pellets were dried at room temperature overnight, and then at 60° C., 90% relative humidity (RH) for 4 weeks. At the end of this time, sample (a) badly rusted, (b) showed no rust, and (c) was moderately rusted.

The next example describes the treatment of magnetic particles by the method of the invention and the testing of the magnetic stability of the treated particles.

EXAMPLE 4

Passivation of Magnetic Particles with PPN Nitrite

Acicular iron particles (0.6 μm in length and 0.2–0.4 μm in width) were treated at room temperature for 5 days with the following.
  A. [PPN]NO$_2$ 1% in methyl ethyl ketone
  B. Tetrabutylammonium nitrite (TAN) 1% in MEK
  C. MEK
  D. No treatment After this treatment, the treated particles of A & B were rinsed briefly with MEK, and all samples were dried at room temperature overnight.

The particles were incubated in porous plastic tubes at 60° C., 90% RH and their magnetization measured over a period of 4 weeks. The data was normalized to an initial value of 100% magnetization and the fraction of magnetization remaining after 4 weeks is listed in Table I.

TABLE I

| Comparative Magnetic Stability of Passivated Iron Particles | |
|---|---|
| Treatment | Magnetization Remaining (σm) |
| (PPN)NO$_2$ | 65% |
| MEK | 60% |
| TAN | 52% |
| No treatment | 45% |

These results show that the iron particles treated by the method of the invention, using (PPN)NO$_2$, retained 65 percent of their magnetization. For reasons that are not understood, the particles treated only with MEK retained 60% of magnetization. In any event, the treatment in accordance with the invention provides a substantial advantage. The treatment with the solution of the organic salt, TAN, in methyl ethyl ketone was less effective than the treatment with MEK alone. The reason is believed to be that the TAN salt is so hygroscopic and absorbs moisture so greatly that it could not effectively protect the iron particles against corrosion.

The next example describes the passivation of iron pellets with PPN chromate.

EXAMPLE 5

Passivation of Iron Pellets with PPN Chromate and Corrosion Testing

Iron pellets were treated in the same manner as described in Example 3 except that the solution for the (b) sample contained the chromate salt of the bis(triphenylphosphoranylidene)ammonium cation of Ex. 2. The pellets were dried and incubated as described in Example 3. After 3 weeks, the controls were rusted while the pellet treated with the chromate salt showed only slight rusting.

The examples above show the effectiveness of nitrite and chromate salts in the method of the invention. It should be understood, however, that the anion of the PPN salt used in the method can be any anion which passivates iron and which does not itself corrode the iron undesirably. Examples of other suitable anions include phosphate, borate and carboxylates.

Also while the examples show the effectiveness of this class of salts with pure metallic iron, corrodable alloys of iron can also be treated by the method of the invention including, for example, iron which is doped with metals such as chromium, nickel, molybdenum and cobalt.

The next example illustrates the method of the invention in the preparation of a magnetic recording tape.

EXAMPLE 6

Corrosion Inhibition in a Magnetic Tape

A magnetic tape formulation was prepared as follows:

| | |
|---|---|
| Iron particles | 300 g |
| Binder* | 60 g |
| Chromium trioxide (abrasive) | 27 g |
| Butoxyethyl stearate (plasticizer) | 3 ml |
| PPN Nitrite | 10 g |
| Solvent** | |

*Binder is "Estane 5715" urethane polymer, a product of B. F. Goodrich Co.
**Solvent is: MEK 70 ml, cyclohexanone 50 ml, methyl glycolate 25 ml.

This formulation was coated on a polyester support, dried, and aged for 50 days at 60° C., 90% RH. After this time, the magnetization was found to be 20% greater than that of a coating which did not contain the PPN nitrite but was otherwise the same and was tested in the same way.

The method of the invention has its most important used is passivating iron particles for magnetic recording materials. Such particles can have a spherical to needle-like or acicular shape. In the latter case their sizes normally range from about 1 to 10 μm in length and 0.2 to 0.4 μm in width. However, the method can be applied in general to the passivation of iron. Any corrodable iron or iron alloy article of any size or shape can be treated by the method of the invention to improve its resistance to oxidative corrosion.

In the manufacture of magnetic recording elements, e.g., a magnetic tape, disk or card, by the method of the invention, the iron particles can be treated with the PPN salt solution before they are incorporated with their binder resin or the salt solution can be blended with the binder resin before or when the iron particles are incorporated with the binder. In any event, the facts that the PPN salt is soluble in the usual binder resin solvent and is non-hygroscopic provide important advantages over prior art treatments.

To prepare a magnetic recording element with iron particles passivated by the method of the invention, the iron particles are mixed with a minor amount of a binder resin, e.g., 10 to 30 parts by weight per hundred parts of iron, in an organic solvent to which a small amount of the PPN salt is added, e.g., 1 to 10 parts by weight per hundred parts of iron. Other minor addenda such as a plasticizer, e.g., butoxyethyl stearate, and an abrasive substance, e.g., chromium trioxide, can also be included if desired. This mixture is then coated in a thin layer on a support and dried. Suitable supports are well known and include films of various film-forming polymers such as polyesters and polycarbonates.

The examples illustrate the use of methyl ethyl ketone as the solvent for the PPN salt. Many other organic solvents, preferably volatile solvents, can be used including methylene chloride, dimethyl formamide, dimethylsulfoxide and others which are compatible with the particular resin being used. A wide selection of binder resins is also suitable such as polyurethanes, (including those crosslinked with polyisocyanates), polyvinyl alcohol-co-vinyl chloride, polyvinyl butyral and others disclosed in U.S. Pat. No. 4,253,886.

The invention has been described in detail with particular reference to preferred embodiments thereof, but it will be understood that variations and modifications can be effected within the spirit and scope of the invention.

We claim:

1. A method for protecting metallic iron and iron alloys against oxidative corrosion which comprises blinding finely divided magnetic particles of iron or iron alloys with a mixture of a binder resin and an organic liquid solution of a salt of the bis (triphenyl phosphoranylidene) ammonium cation and a non-corrosive passwaiting anion, coating the blend as a layer on a support and removing the solvent from the coated layer.

2. A method according to claim 1, wherein the binder resin is polyurethane.

3. A magnetic recording element comprising a support on which is coated a layer which comprises a binder resin, iron particles and a salt of the bis-(triphenylphosphoranylidene) ammonium cation with a non-corrosive, passivating anion.

4. An element according to claim 3, wherein the anion is the nitrite ion.

5. An element according to claim 3, wherein the anion is the chromate ion.

* * * * *